United States Patent Office 2,989,484
Patented June 20, 1961

2,989,484
FOAMING CLEANSING COMPOSITION
Alfred Kirstahler and Karl Goldann, Dusseldorf, Germany, assignors to Böhme Fettchemie G.m.b.H., Dusseldorf, Germany, a corporation of Germany
No Drawing. Filed Apr. 17, 1957, Ser. No. 653,302
Claims priority, application Germany Aug. 19, 1956
5 Claims. (Cl. 252—110)

This invention relates to foam-improving agents, and more particularly to high-molecular aminocarboxylic acid amides having free carboxyl groups in the molecule which are useful in improving the volume and texture of foams or lathers.

It is well known that ethanolamides of high-molecular fatty acids are useful as foam-improving and foam-stabilizing additives in such foaming cleansing compositions as soaps, detergents, shampoos, and the like. The disadvantages of these ethanolamides are, however, that they must be used in relatively large quantities, that they lose their effectiveness as soon as the cleansing solution becomes contaminated with soil from the soiled clothes, hair or other objects being cleansed therewith, and that they become ineffective if the cleansing solution is boiled. Consequently, cleansing compositions comprising ethanolamides of high-molecular fatty acids as foam-improving and foam-stabilizing agents are limited virtually to a single-time use and must be replenished quite often.

It is therefore an object of the present invention to provide effective foam-improving and foam-stabilizing additives for foaming compositions of all types which will retain their effectiveness even after the foaming solution becomes contaminated with soil or is boiled.

Another object of the present invention is to provide foam-improving and foam-stabilizing additives for foaming compositions of all types which produce the desired advantageous effects at concentrations substantially less than the known foam-improving additives.

Other objects and advantages of the present invention will become apparent as the description proceeds.

Copending application Serial No. 645,662, filed March 13, 1957, now U.S. Patent No. 2,921,960, describes the production of high-molecular aminocarboxylic acid amides having free carboxyl groups in the molecule by reacting polybasic aminocaboxylic acids having a tertiary nitrogen atom in the molecule with equi-molar amounts of high-molecular primary or secondary amines to form the corresponding amino-salts, and thereafter splitting off water from these salts.

Such high-molecular aminocarboxylic acid amides have the general structural formula

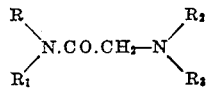

wherein R is a lipophilic radical—that is, an aliphatic, cycloaliphatic or aromatic radical with at least 6 carbon atoms—which may be interrupted by heteroatoms—that is, by oxygen, sulfur or nitrogen atoms—or may carry substituents, $R_1$ is hydrogen or a lipophilic radical, $R_2$ is hydroxyalkyl or monocarboxy-methyl and $R_3$ is monocarboxymethyl.

Examples of polybasic aminocarboxylic acids having a tertiary nitrogen atom in the molecule which may be used in the production of these aminocarboxylic acid amides are the following: nitrilo-triacetic acid, ethylenediamine tetraacetic acid, N-hydroxyalkyl-imino-diacetic acids, such as N-hydroxyethyl-imino-diacetic acid, N-hydroxyethylethylenediamine triacetic acid, and the like.

Examples of high-molecular primary and secondary amines which may be used in the production of the amino-carboxylic acid amides in accordance with said copending application are aliphatic, cycloaliphatic and fatty aromatic amines wherein the hydrocarbon radical has at least 6 carbon atoms; i.e., those hydrocarbon radicals which are commonly referred to as lipophilic radicals. These lipophilic radicals may also be interrupted by heteroatoms—that is, oxygen, sulfur or nitrogen atoms—and may also carry substituent groups. Specific amines which fall into this classification are the following: hexylamine, dodecylamine, oleylamine, octadecylamine, cyclohexylamine, alkyl-cyclohexylamines wherein the alkyl radicals have from 3 to 12 carbon atoms, naphthenylamines, aniline, alkylanilines wherein the alkyl radicals have from 3 to 18 carbon atoms, mixtures of amines, such as a mixture of high-molecular amines the alkyl radicals of which correspond to the fatty acid esters found in coconut oil, and secondary amines such as methyl-oleylamine, ethyldodecylamine, didodecylamine, and the like.

The formation of the corresponding amino-salts may be carried out in the usual manner, that is by allowing the starting materials to react at slightly elevated temperatures in aqueous solutions or organic solvents, or also by fusing a mixture of the starting components.

The splitting off of water from the amino-salts may be carried out by heating the salts under dry conditions to temperatures above 100° C., preferably to 180–200° C., and in a vacuum. After working up the product in accordance with customary methods, the substituted aminocarboxylic acid amides according to the invention are obtained with good yields and in the form of light-colored, wax-like products which are soluble or dispersible in water.

Using the reaction of dodecylamine with nitrilo-triacetic acid as an illustrative example, the reaction takes place according to the following equation:

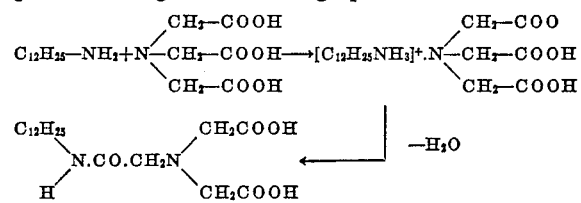

We have found that aminocarboxylic acid amides and their amino-salts described in said copending application, which are soluble or dispersible in water and the free carboxyl groups of which may be neutralized with inorganic or organic bases, are useful as foam-stabilizing and foam-improving additives in foam-producing compositions which are employed to prepare foamy washing, cleaning, rinsing, wetting or penetrating solutions. The aminocarboxylic acid amides increase the volume of the foam, the stability of the foam and its capacity to absorb water. Moreover, they unfold their effective action in hot and cold water, in hard water, as well as in foamy solutions which are relatively highly contaminated with impurities such as soil from dirty fabrics and the like. Still further, the aminocarboxylic acid amides or their salts accelerate the formation of the foam and therefore facilitate the sudsing action.

The aminocarboxylic acid amides and their corresponding amino-salts are produced according to the method described in said copending application. However, it is not essential to use that particular method; instead, other conventional methods of producing aminocarboxylic acid amides or their amino-salts may be used.

The foam-improving agents in accordance with the present invention may be added to all known anion-active or electroneutral foaming agents or to aqueous solutions thereof. Examples of typical foam-forming agents in conjunction with which the foam-improving agents according to the invention may be employed are the following: high-molecular alkyl sulfates and sulfonates, alkylbenzenesulfonates, ethyleneoxide addition products of high-molecular alcohols, amines, carboxylic acids or carboxylic acid amides, and the like. The foam-improving agents herein disclosed may also be added to washing and cleansing compositions which comprise customary auxiliary washing agents, such as alkali metal phosphates, silicates, carbonates and so forth. In other words, the foam-improving agents may be added to the foam-producing washing and cleansing compositions which are customarily used for laundering, cleaning and body hygiene in the household, for industrial washing processes, for textile-finishing purposes, and so forth.

The aminocarboxylic acid amides or their amino-salts are added to the foam-producing base compound, composition or solution in amounts ranging from 0.5 to 6.0% by weight, preferably from 1 to 3% by weight, based on the total dry weight of foam-producing base. The amounts of foam-improving agent according to the invention necessary to produce the desired result are therefore well below the quantities of known foam-improving and foam-stabilizing agents required to produce a substantially equal result.

The following examples will further illustrate the present invention and enable others skilled in the art to understand our invention more completely.

*Example I*

A toilet soap base having a fatty acid content of 80%, produced from tallow fatty acid and coconut oil, was admixed in a soap mill with 2% by weight, based on the weight of soap base, of the sodium salt of a condensation product obtained by condensing nitrilo-triacetic acid with a mixture of high-molecular alkyl amines the alkyl radicals of which corresponded to the fatty acid radicals of coconut oil. The sodium salt had the structural formula

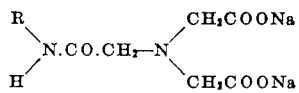

wherein R represents the fatty hydrocarbon radicals in coconut amine. Thereafter the modified soap composition was scented and shaped into cakes in accordance with customary methods. In use, the soap formed a creamy, stable foam composed of fine bubbles. Without the use of the aminocarboxylic acid amide salt additive the quality of the foam was substantially inferior.

*Example II*

A liquid hair shampoo which contained as a foam-producing agent 25% by weight of a sulfated and with triethanolamine neutralized fatty alcohol mixture, comprising alkyl radicals with from 12 to 18 carbon atoms, was admixed with 3% by weight, based on the weight of foam-producing agent, of the sodium salt of the condensation product obtained by condensing dodecylamine with N-β-hydroxyethyl-imino-diacetic acid. The aminocarboxylic acid amide salt and the structural formula

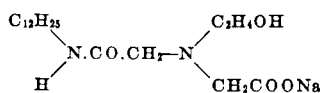

In use, the modified hair shampo lathered very rapidly and formed a very large volume of fine-textured, stable foam.

*Example III*

A soap-base washing powder having the following composition:

35% soda soap
26% soda
20% sodium pyrophosphate
5% sodium perborate
4% sodium silicate
2% carboxymethyl cellulose
8% water was admixed with 2% by weight, based on the weight of washing powder, of the sodium salt of the condensation product obtained by condensing nitrilo-triacetic acid with a mixture of high-molecular alkyl amines the alkyl radicals of which corresponded to the fatty acid radicals of coconut oil. The aminocarboxylic acid amide salt product had the structural formula

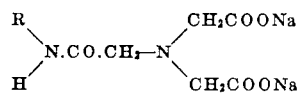

wherein R represents the fatty hydrocarbon radicals in coconut oil. An aqueous laundering solution produced with this modified washing powder exhibited distinctly improved sudsing characteristics, and the foam had much greater stability than when the unmodified washing powder was used to prepare the laundering solution.

*Example IV*

A detergent-base washing powder having the following composition:

17% mixture of alkyl sulfates (alkyl radicals with 12 to 18 carbon atoms) and alkylbenzene sulfonates (alkyl radicals with 12 carbon atoms)

35% sodium polyphosphates
15% sodium sulfate
10% sodium perborate
9% sodium silicate
1.5% lauryl alcohol
1% carboxymethyl cellulose
11% water was admixed with 1 to 2% by weight, based on the weight of washing powder, of the sodium salt of the condensation product obtained by condensing dodecylamine with hydroxyethyl-imino diacetic acid. The sodium salt had the structural formula

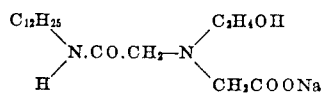

Aqueous washing solutions produced with this modified detergent powder exhibited substantially improved sudsing characteristics and the foam was highly stable.

*Example V*

2% by weight of the condensation product obtained by condensing ethylene-diamine tetra-acetic acid with oleyl amine were used instead of the condensation product of nitrilo-triacetic acid with a mixture of high-molecular alkylamines in Example I. A well foaming soap was obtained.

*Example VI*

3% by weight of the condensation product obtained by condensing N-hydroxyethyl-ethylene-diamine-triacetic acid and a mixture of naphthenyl-amines was substituted for the condensation product of N-β-hydroxyethyl-imino-diacetic acid and dodecylamine according to Example II. The liquid hair shampoo obtained forms a very large volume of fine-textured foam.

*Example VII*

2% of the condensation product obtained by condensing ethylene-diamine-tetra-acetic acid and methyl oleyl amine are substituted for the condensation product from nitrilo-triacetic acid with a mixture of high-molecular alkyl amines according to Example III. A washing powder with excellent sudsing characteristics is obtained.

*Example VIII*

1 to 2% by weight of the condensation product obtained by condensing of nitrilo-triacetic acid with a mixture of alkyl cyclohexyl amines having alkyl radicals of $C_3$–$C_{12}$ are used instead of the condensation product from hydroxy-ethyl-imino-diacetic acid with dodecylamine in Example IV. The obtained detergent powder possesses excellent washing properties.

*Example IX*

The following process illustrates one method for producing foam-improving agents of the type used in the above Examples I to VIII.

27.7 gm. n-dodecylamine were dissolved in 300 cc. methanol and then 28.1 gm. hydroxyethyl-imino-diacetic acid were added to the solution at 50–60° C., accompanied by stirring. After stirring for an additional hour at 65° C. and allowing the reaction mixture to cool to 10° C., the precipitate formed thereby was filtered off by suction filtration and dried. The yield was 47 gm. of the monododecylamine salt of hydroxyethyl-imino-diacetic acid. By evaporation of the mother liquor, the yield of reaction product was increased to 50.5 gm. The salt thus obtained was heated at 180–190° C. in a vacuum of about 12 mm. Hg, and when necessary in a stream of nitrogen gas, until no more water was split off, which was evidenced by the cessation of the formation of bubbles. The residue was dissolved in methanol and transformed into the corresponding sodium salt by adding thereto a methanolic sodium hydroxide solution consisting of 5.8 gm. sodium hydroxide dissolved in 100 cc. methanol. Thereafter, the methanol was evaporated in vacuo, and the residue was dried in vacuo at a temperature of 70° C. The yield was 52.5 gm. of a compound having the structural formula

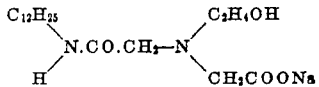

which corresponds to 93% of the theoretical yield based on the amount of n-dodecylamine originally used.

While we have illustrated the present invention with the aid of certain specific embodiments thereof, it will be apparent to those skilled in the art that the invention is not limited to these specific embodiments and that various changes and modifications may be made without departing from the spirit of the invention or the scope of the appended claims.

We claim:

1. A foaming-cleansing composition consisting essentially of a surface-active component selected from the group consisting of water soluble soaps, synthetic organic non-soap anionic detergents and synthetic organic non-ionic detergents which produces a foam in aqueous solution and, as a foam-improving and foam-stabilizing additive, from 0.5 to 6.0% by weight, based on the foam-producing component, of a compound selected from the group consisting of amino-carboxylic acid amides having the structural formula

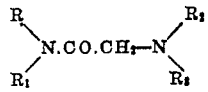

wherein R is an aliphatic hydrocarbon radical containing from 6 to 18 carbon atoms, $R_1$ is a hydrogen atom, $R_2$ is selected from the group consisting of lower hydroxyalkyl and mono-carboxy-methyl and $R_3$ is monocarboxy-methyl, and their alkali metal salts.

2. The detergent composition of claim 1 wherein up to 35% by weight of sodium polyphosphate is present.

3. A toilet soap consisting essentially of a tallow fatty acid-coconut oil soap and 2% by weight, based on the weight of said soap, of a compound having the structural formula

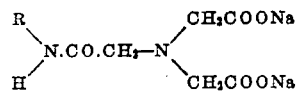

wherein R represents hydrocarbon radicals corresponding to the fatty acid radicals in coconut oil.

4. A liquid hair shampoo consisting essentially of a 25% aqueous solution of a sulfated and triethanolamine-neutralized fatty alcohol mixture comprising alkyl radicals with 12 to 18 carbon atoms, and 3% by weight of the compound having the structural formula

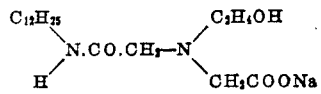

5. A washing powder consisting essentially of a higher fatty acid sodium soap and 2% by weight of a compound having the structural formula

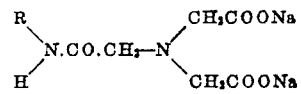

wherein R represents hydrocarbon radicals corresponding to the fatty acid esters in coconut oil.

References Cited in the file of this patent

UNITED STATES PATENTS

| | | |
|---|---|---|
| 2,191,738 | Balle | Feb. 27, 1940 |
| 2,383,740 | Tucker | Aug. 28, 1945 |

FOREIGN PATENTS

| | | |
|---|---|---|
| 337,737 | Great Britain | Oct. 27, 1930 |